United States Patent [19]

Mletzko

[11] Patent Number: 4,992,630
[45] Date of Patent: Feb. 12, 1991

[54] DIGITIZER TABLET WITH USER CUSTOMIZATION OF STYLUS PROXIMITY AND PRESSURE

[75] Inventor: Alfred E. Mletzko, Woodbury, Conn.

[73] Assignee: Summagraphics Corporation, Seymour, Conn.

[21] Appl. No.: 378,372

[22] Filed: Jul. 11, 1989

[51] Int. Cl.⁵ .............................................. G08C 21/00
[52] U.S. Cl. ........................................ 178/18; 178/19; 340/711
[58] Field of Search ................... 178/18, 19; 340/711

[56] References Cited

U.S. PATENT DOCUMENTS

| | | | |
|---|---|---|---|
| 3,735,044 | 5/1973 | Centner et al. | 178/19 |
| 3,904,822 | 9/1975 | Kamm et al. | 178/19 |
| 4,128,829 | 12/1978 | Herbst et al. | 340/146.354 |
| 4,369,439 | 1/1983 | Broos | 340/710 |
| 4,389,711 | 6/1983 | Hotta et al. | 364/556 |
| 4,451,895 | 5/1984 | Sliwkowski | 364/521 |
| 4,455,451 | 6/1984 | Kriz | 178/18 |
| 4,476,463 | 10/1984 | Ng et al. | 340/712 |
| 4,523,654 | 6/1985 | Quayle et al. | 178/19 |
| 4,578,768 | 3/1986 | Racine | 364/500 |
| 4,600,807 | 7/1986 | Kable | 178/19 |
| 4,677,258 | 6/1987 | Kawashima et al. | 178/18 |
| 4,687,885 | 8/1987 | Talmage, Jr. et al. | 178/18 |
| 4,692,809 | 9/1987 | Beining et al. | 358/247 |
| 4,700,176 | 10/1987 | Adler | 340/365 R |
| 4,761,637 | 8/1988 | Lucas et al. | 340/365 P |
| 4,788,386 | 11/1988 | Matthews et al. | 178/19 |
| 4,821,029 | 4/1989 | Logan et al. | 178/18 |

OTHER PUBLICATIONS

Sac (Advert.) Cadalyst (Journal), Jul. 1987, vol. 4, No. 4.
Seiko, (Advert.) Cadence (Journal), Sep. 1987, vol. 2, No. 9.
Hitachi, (Advert.), Cadalyst (Journal), May 1988, vol. 5, No. 4.
"Landcadd Update", Charles Pietra, Cadalyst (Journal), Jul./Aug. 1988, vol. 5, No. 6, pp. 36, 37.
EverCad (Advert.) Cadence (Journal), Jul. 1988, vol. 3 No. 7.
Digitizer Review (Advert.), Cadence (Journal), Jun. 1987, vol. 2, No. 6.

Primary Examiner—Stafford D. Schreyer
Attorney, Agent, or Firm—Rosen, Dainow & Jacobs

[57] ABSTRACT

A digitizer tablet provided with menus over the marginal areas in the non-linear boundaries of the regular electrode array. Coordinate signals from the menu areas are processed to vary a parameter of the processing circuitry for the coordinate value outputs.

17 Claims, 4 Drawing Sheets

DIGITIZER TABLET WITH USER CUSTOMIZATION OF STYLUS PROXIMITY AND PRESSURE

This invention relates to a digitizer, and in particular to a digitizer tablet of the type comprising electrodes adjacent the tablet surface and cooperating with a pointing device to generate electrical signals representative of the pointing device location on the tablet surface.

BACKGROUND OF THE INVENTION

Digitizing tablets are well known in the art. They employ a variety of technologies. See, for example, the description in the January, 1989 issue of BYTE magazine, pages 162-174. The typical tablet comprises a regular array of electrode wires mounted in the tablet underneath its surface and extending generally parallel to an X, Y coordinate grid. In a typical construction, the electrodes are energized and emit a signal which is picked up by a pointing device positioned on or over the tablet surface. Processing of the signals from the cooperating electrodes and pointing device returns a pair of digitizer values representative of the X, Y coordinates of the pointing device location. Pointing devices typically come in the form of a cursor or a stylus, and for convenience the term stylus will be used to generally refer to any kind of pointing device that can cooperate with the electrode array to generate the desired coordinate signals. One of the significant parameters involved in this mechanism is what is known as stylus proximity. Since the interaction between the electrodes and stylus is by way of an electromagnetic or electrostatic field, stylus proximity defines how far the stylus can be raised above the tablet before it stops generating coordinate data. The tradeoff here is between accuracy and proximity. The larger the proximity value, the more accuracy or resolution suffers, because of the spreading of the fields. Hence, it is conventional for the tablet manufacturer to determine at the factory the proximity threshold level above which the tablet will no longer process data, as it would fall outside its resolution specification. However, these digitizer tablets are frequently used for the purpose of digitizing drawings, in which application the user places the drawing on the top of the tablet surface and traces the lines with the stylus. Thick drawings naturally place the stylus further away from the tablet surface. If the proximity threshold level has been set by the manufacturer at, say, ¼ inch, then the user will not be able to trace a drawing that is thicker than ¼ inch.

Another problem associated with the way in which the user operates the stylus is the control over the stylus functions. For instance, it is common to include button activated electrical switches and the like so that the user can "turn on" the stylus and "turn off" the stylus at will. This is to prevent the digitizer recording stylus positions in which the stylus is approaching or withdrawing from the drawing to be traced, which the user can control by only activating the tablet when the stylus is actually in contact with the drawing. As an alternative to these more expensive switch-activated systems, the tablet can be adjusted at the factory with a very small proximity threshold level. But again the versatility of the device is sacrificed because then only drawings on thin paper can be copied.

Another problem arises in connection with stylus pressure exerted by the user on the tablet surface. Some users would prefer, for example, to rest their hand on the tablet while pressing the stylus in order to more accurately follow the contour of the drawing. Each user has his own style. Yet, the versatility of the tablet is restricted as a result of the tablet manufacturer setting at the factory the pressure threshold level above which the tablet is activated. As a result, the users have to adjust their style to the tablet settings.

It is evident from the forgoing description that a need exists in the art for a digitizer tablet in which the user can, so-to-speak, customize the stylus proximity and the stylus pressure parameters to his own style or to the application. The obvious solution to this problem is to place manual controls on the tablet that would allow the user to manually set the proximity and pressure threshold levels. This, however, is an expensive solution requiring more parts and more circuitry and also an undesirable tablet appearance.

Another solution to the problem is described in commonly assigned U.S. Pat. No. 4,788,386, of which I am one of the joint inventors. The tablet described in that patent, whose contents are hereby incorporated by reference, employs electrostatic fields for determining stylus location. In particular, the stylus is capacitively coupled to the electrodes. The proposal in that patent is to provide along the outside of the tablet separate from the regular electrode array, a series of additional electrodes in different geometric patterns, termed menu electrodes. These menu electrodes are connected to the regular position determining electrodes. The signals from these special menu electrodes can be recognized and distinguished from the position coordinate signals by signal magnitude. The menu electrodes are given a different geometry from the position determining electrodes and therefore would generate a signal of different magnitude. When it is determined that a menu signal has been generated then, as this patent explains, a specific software routine can be invoked to modify the processing of the signals. Among the modified processing possible described is varying the stylus proximity threshold and pressure threshold levels. Other parameters could also be varied. A disadvantage of this approach is the requirement for including these special geometric menu electrodes into the tablet.

BRIEF SUMMARY OF THE INVENTION

An object of the invention is a digitizer tablet that can be customized by the user.

A further object of the invention is a low-cost tablet which allows the user to vary parameters of the processing circuitry.

Still another object of the invention is a low-cost tablet providing menu areas for varying the stylus proximity and pressure threshold levels for operation by the tablet user.

The invention is based upon the recognition that software can be provided to recognize the marginal areas overlying the edges of the buried electrode geometric arrays or patterns. In particular, the invention is based upon taking advantage of the normally unused marginal areas in which the stylus interaction with those marginal areas adjacent to the electrode pattern edges or border is nonlinear in the sense that stylus movements along those marginal areas are non-linearly related to the signal outputs. The practice has been not to use those marginal nonlinear areas, typically achieved by providing shielding bordering a so-called active area of the tablet inside the marginal area. Signals will only be generated with a stylus over the active area, and the active area is defined to include the linear area of the tablet. Having available, therefore, unused marginal areas of the tablet in which stylus locations can be determined, though not precisely, allows the provision of menu areas at those marginal locations. More specifically, wide area menus are provided, in order not to be detrimentally affected by the nonlinear or less accurate character of that area.

In a preferred arrangement, only four menu areas are provided, over the left and right sides of the marginal area and over the top and bottom sides of the marginal area.

In accordance with another feature of the invention, two of the four menu areas are used for increasing and decreasing the stylus proximity threshold, and the other two menus are used for increasing and decreasing the stylus pressure threshold level.

DETAILED DESCRIPTION OF THE PREFERRED EMBODIMENTS

The invention is generally applicable to digitizer tablets employing any kind of electromagnetic or electrostatic interaction between a regular array of electrodes arranged in the tablet at or below its surface and a pointing device in the form of a cursor or stylus and connected to the electrodes such that, when the combination is driven, the electrodes and stylus cooperate to generate electrical signals representing the X and Y coordinates of the stylus location over the tablet. Tablets employing electromagnetic interactions, typified by U.S. Pat. Nos. 3,735,044 and 3,904,822, assigned to the same assignee as this case, are characterized by so-called edge electrode effects, wherein special steps have to be taken to define a linear active area which typically lies within the electrode boundaries. One typical step is to shield the border area around the electrode pattern edges. In these kinds of tablets, stylus proximity is a significant parameter.

In other kinds of tablet construction typified by U.S. Pat. No. 4,788,386, a similar problem of nonlinear marginal areas exist, as well as a similar solution employing shielding, which is described in said patent. The invention can be used with either kind of tablet.

Figure 1:
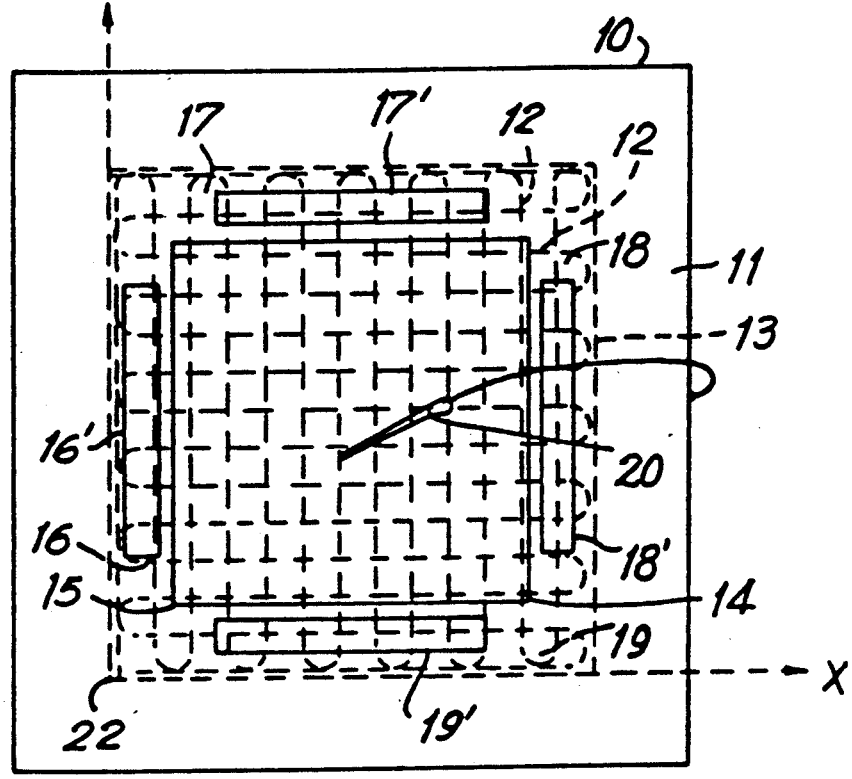
FIG. 1 is a schematic plan view of one form of digitizer tablet in accordance with the invention.

FIG. 1 is a plan schematic view of one form of tablet in accordance with the invention designated 10. In this instance, the tablet is of the electrostatic type and contains a regular or periodic array of electrodes mounted in a plane parallel to and just underneath the tablet top surface 11 which is planar. The electrode layer, shown schematically here at 12, is of the type described in great detail in my U.S. Pat. No. 4,788,386, referenced 50, 60 and 70 in FIG. 3 of the patent, and need not be repeated here. The important consideration is that this regular electrode pattern covers an area defined by its outer edges, indicated in FIG. 1 of this application by the dashed rectangle 13. Though the electrode pattern covers the entire area of the rectangle 13, stylus interactions at or in the vicinity of the rectangle sides are usually not linear. That is to say, unit movements of the stylus over the rectangle 13 sides will not always produce the same change in X or Y coordinate positions. To make those interactions linear and accurate would require greatly added expense in hardware or additional significant space in firmware limiting the addition of additional formats or other functions. Hence, especially for low cost tablet systems, the practice in the industry has been to define on the tablet surface 11 a smaller rectangular area 14, lying wholly within the larger rectangle 13, by, for example, marking on the tablet surface this smaller rectangular area, with one corner, typically the lower left corner 15, representing the origin of the X, Y coordinate system insofar as the user is concerned. This inner rectangle 14 defines therefore the active area of the tablet, whose sides extend parallel to the X and Y axes depicted in FIG. 1. The areas located between the sides of the two rectangles 13, 14 are herein designated as the "marginal" or "border" areas. As shown, four marginal areas designated 16–19 result.

A pointing device, referred to herein as a stylus, is schematically shown at 20. It is connected as shown to the tablet, and cooperates with the electrode pattern to generate the X, Y position electrical signals. As mentioned above, the stylus 20 interaction with the electrode pattern 12 is linear within the inner rectangle 14, and is nonlinear within the marginal areas 16–19. To reduce stylus interaction with the marginal electrode areas, it is common in the prior art to provide a grounded shielding electrode overlying the electrode portions at the marginal areas 16–19 to reduce or prevent nonlinear signal outputs.

In the present invention, the marginal areas 16–19 are not electrically shielded. As a result, when the stylus 19 is located over those marginal areas, X, Y position signals are generated. But, in the invention, these X, Y signals are not outputted from the tablet, but are used to adjust parameters of the signal processing circuitry.

Figure 2:
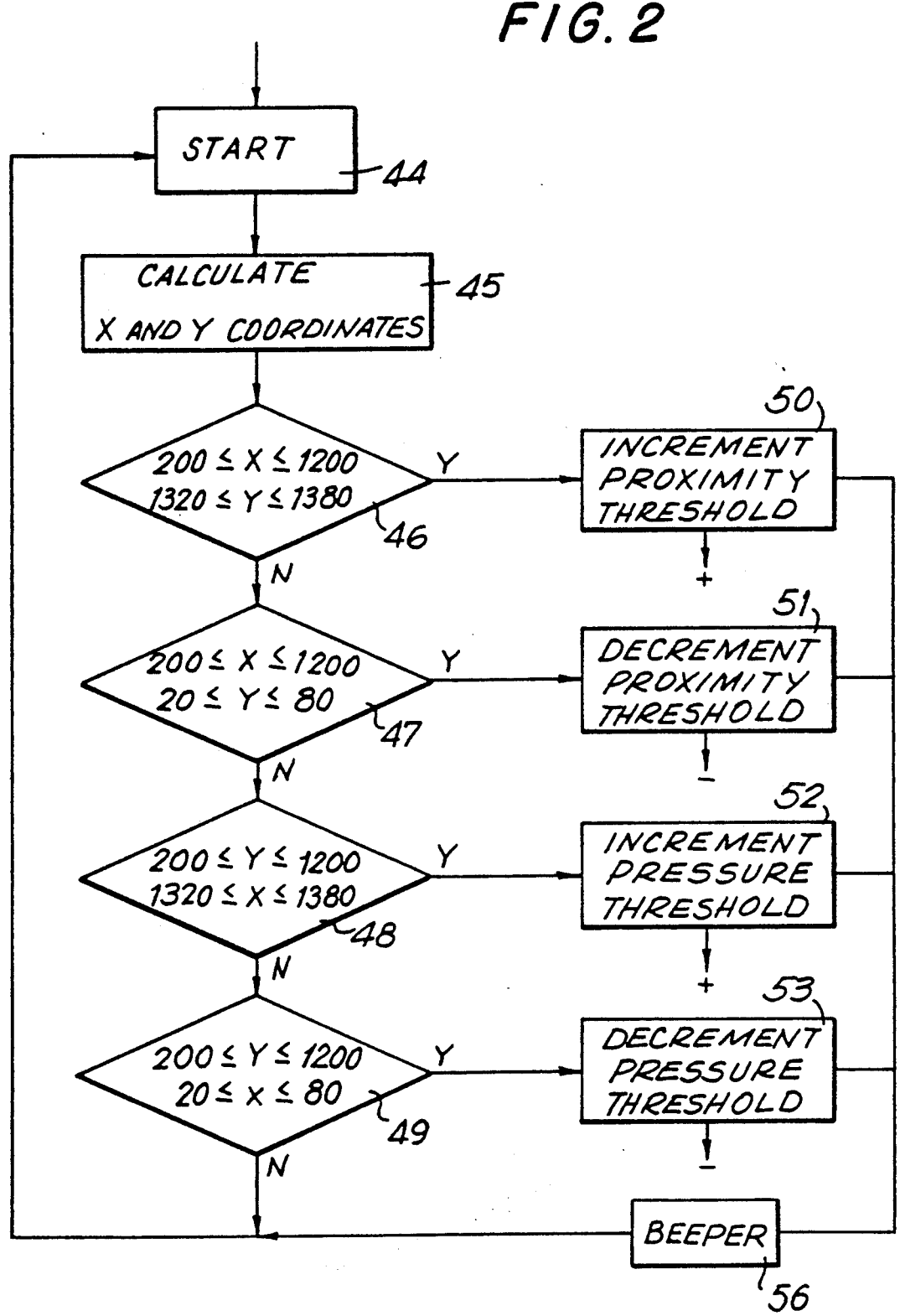
FIG. 2 is a flow chart illustrating one way of implementing one form of tablet in accordance with the invention.
Figure 4:
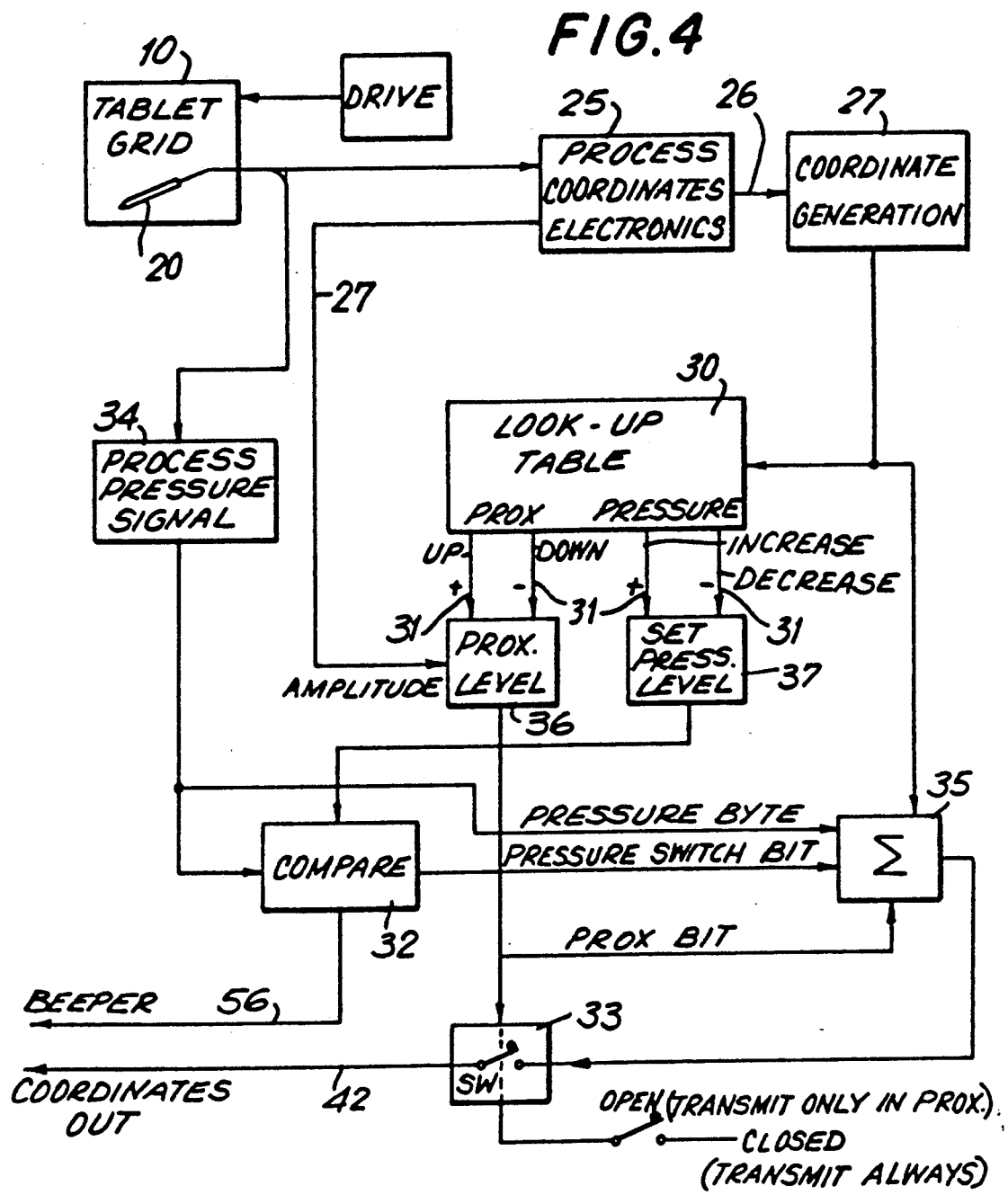
FIG. 4 is a block circuit diagram showing processing of the electrical signals in accordance with one embodiment of the tablet according to the invention.

The signal processing circuitry is completely described in my aforementioned patent, and need not be repeated here, but a brief summary will be provided in connection with the block circuit diagram of FIG. 4 and the software flow chart of FIG. 2. As explained in the patent, the stylus-electrode generated electrical signals are typically amplified and otherwise processed in a well-known manner not important to this invention, resulting eventually in two electrical signals representing X and Y position digital numbers. Each number is relative to an origin, in the case of this invention, not the origin 15 of the active area but the origin 22 of the larger rectangle 13. The values of these two numbers depend upon the tablet resolution and size. For a typical 12-inch × 12-inch active area, with a resolution of, as an example, 100 lpi and an accuracy of 0.025 inches, the digital numbers outputted for both X and Y axes will vary in the range from 0..1200. Assuming, however, that the marginal areas are about one inch in width, the actual digital numbers internally present in the circuit before outputting would range from 0..1400. My aforementioned patent shows how suitable software can be provided to process these internal digital signals, which essentially consist of storing the internal X and Y digital numbers, and then testing those stored numbers against a set of fixed number ranges. When a match is found, a subroutine is invoked. The numbers are tested for the non-position information, and if no match is found it is assumed that the numbers represent stylus locations over the active area, and those numbers are then outputted to the external world.

In the invention, similar processing is employed, except in the way the signals from the marginal areas 16-19 are used. This will be clearer, again, from reference to my patent. As mentioned in the patent, the circuits there described have provision for changing the stylus proximity and pressure thresholds. Before the X and Y signals are outputted as position information, their magnitude is measured, digitized and compared in a conventional comparator circuit against two values representing a set proximity value and a set pressure value. The tablet can be configured to transmit only if the signal magnitudes exceed those thresholds. Those setting threshold values are stored as digital numbers in suitable registers or memory locations, and can be altered, very simply, by increasing or decreasing their values. So, for example, if the current proximity threshold value is set at 11, it can be lowered by reducing the value to, say, 8, or raised by increasing the value to, say, 20. In my patent, signals emanating from certain of the menu electrodes are treated as parameter-varying values. If the user wants to vary the proximity or pressure threshold values, he uses his stylus to touch the special menus associated with each of those parameters, and the resultant signals when processed will cause the number stored in the related register or memory location to be appropriately varied.

In my present invention, I use a similar approach, except that no special menu electrodes have to be provided. FIG. 4 illustrates, in block form, an appropriate circuit. The description that follows applies to the diagram shown which depicts a grid or tablet driven system, but would apply equally to a cursor or stylus driven system. The details of the various blocks can be found in my patent or would be otherwise evident from the description given to one skilled in the art.

The signals outputted from the electrodes or stylus are processed 25 in the usual manner to produce electrical signals comprised of digital outputs 26 representing coordinate information and digital outputs 27 representing magnitude or amplitude information. The stylus 20 transmits two signals to the electronics. One is the positional information signal produced by the grid. The second is that generated by pressure transducer electronics inside the stylus 20. These are processed by two different sets of electronics. The pressure information is processed by block 34 and inputted to a compare block 32 and summer 35. The positional information is processed 25 and with the help of a microcontroller converted into coordinates 28 which would be between 0 and 1400 in my example. These would be compared to coordinate values stored in a look-up table 30 to determine if they fall within the marginal or outside borders of the operational areas. When they do, one of the four output lines 31 (two for prox, two for pressure) would be activated to increase (+) or decrease (−) the prox or pressure.

Figure 4A:
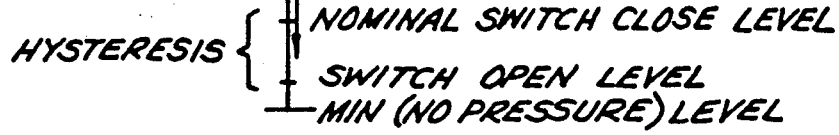
FIG. 4A is a curve showing the stylus pressure of the stylus pressure transducer.

When the pressure level is increased, for example, the "nominal switch close level" for the stylus pressure transducer, shown in FIG. 4A, would increment up by one count (a typical range for pressure would be 64 or 32 counts). Then when the stylus is used next time, additional pressure equal to one count would be required to be executed by the user to exceed this level. The "nominal switch close level" is the point at which when the stylus is pressed down in the normal active area of the tablet, or even off the tablet, the compare function block 32 outputs a pressure switch bit and a beeper signal 56 for audible feedback. The set pressure level block 37 provides the increment or decrement input for the level stored in the compare block 32. The pressure switch bit in block 35 is then added to or set in the output format indicating a closed switch. Additionally, the processed pressure signal 34 which is looked at in the compare block 32 can also be added to the final output format as a pressure byte. The complete coordinate output with or without the pressure byte and pressure bit is summed at block 35 and then outputted through a switch (software) 33 which is controlled by a proximity bit. The latter is derived from the prox level block 36. Normally, the proximitY of the stylus is a function of the amplitude of an analog signal, which in turn is proportional to the height above the working surface. In this typical application, this analog signal passes through the prox level block 36 which controls the proximity bit in one of the output bytes. In addition, in many embodiments, this bit also is used to control as shown the transmission of data from the tablet through the software switch 33, which switch can be if desired overridden by another switch, usually mechanical.

Figure 1A:
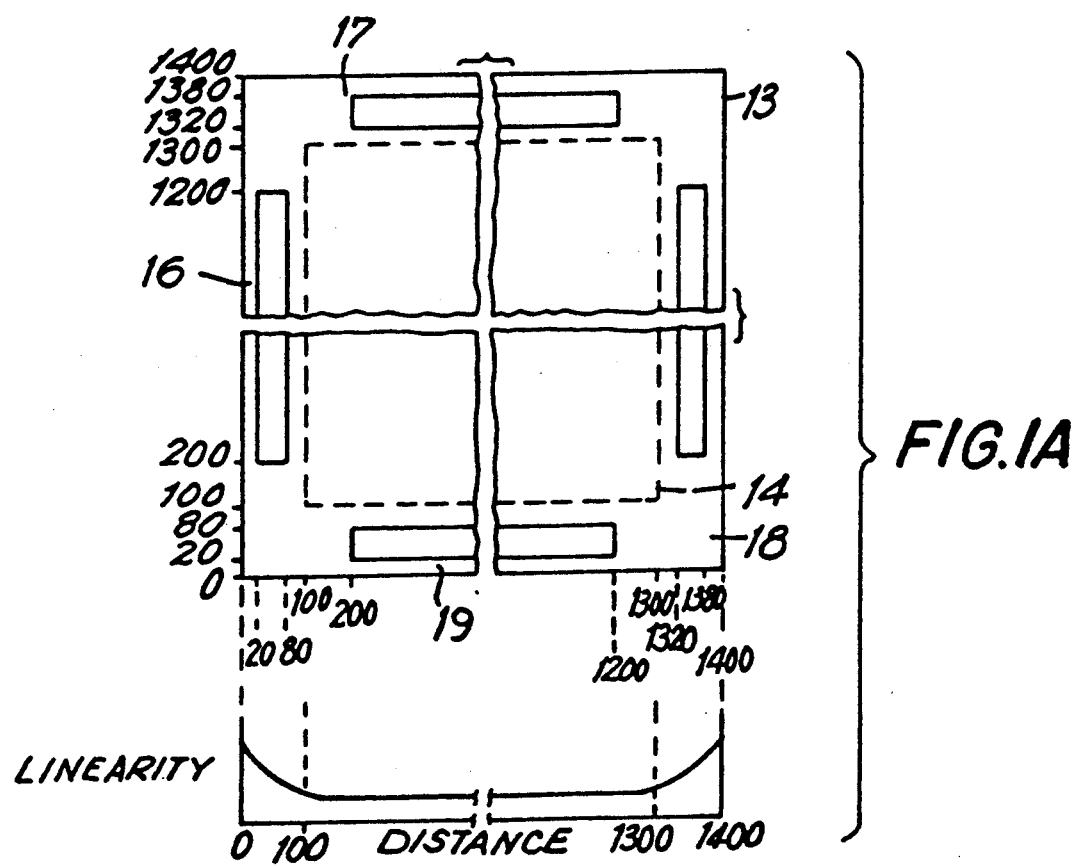
FIG. 1A is a graphic plot (not to scale) of the layout of FIG. 1 illustrating relative locations of different areas in accordance with the invention.

As will be clear from the foregoing, the coordinate information is processed by a software controlled microprocessor (not shown) which compares the coordinate values against values stored in the look-up table 30. If the values are outside the ranges associated with the marginal areas, then the signals are treated as good coordinate data, from the active area, and are outputted via switch 33. If the coordinates fall within any of the ranges associated with the marginal areas, one of four possible outputs 31 are generated. As an example only, for the coordinate range previously indicated of 0..1400, one would typically expect a curve of linearity against distance to appear as shown in FIG. 1A along the X-axis. The same curve would also apply to the Y-axis. In the active area range between counts 100 and 1300, the output would be linear. In the marginal area ranges 0..100 and 1300..1400, the output would be non-linear, but still usable for the purposes of the invention. It is useful, in this example, to define the active or working area of the tablet as the range of 100..1300, the overall operational area as 0..1400 where positional information can be obtained from the tablet, and a so-called picking area in which, by use of a label or other means, is smaller than the marginal areas in which position information can be obtained. This is done to keep the user safely in the non-linear area. So, for the example given, the marginal areas 16-19 have coordinates of: 0..100,0..1400; 0..1400,1300..1400; 1300..1400,0..1400; 0..1400,0..100,respectively But the respective picking areas referenced 16'-19', are reduced to: 20..80,200..1200; 200..1200,1320..1380;1320..1380, 200..1200; 200..1200,20..80. The typical picking area size for the 12×12 inch tablet would then be about 0.6×10 inch. Then, for this example, if the X coordinate data is in the range of 200..1200, and the Y coordinate data is in the range of 1320..1380, an output + is triggered to increase the prox level. The outputs for the other ranges is evident from the selection nodes in FIG. 2. The four outputs actuate known incrementing or decrementing circuitry which in turn raise or lower the value of a number stored in registers in blocks 36 and 37, respectively. These registers act as the stores for the set proximity and pressure threshold values. A comparator in the blocks 36 compares the magnitude signals with the stored value in its register. If they exceed the stored value, the switch 33 is enabled and the X,Y coordinate data outputted at 42.

A flow chart of the software is illustrated in FIG. 2. A start command, executed, for example, by the user, causes the calculation 45 of the X,Y coordinates. Each of the four ranges corresponding to the picking areas are tested, shown by the selection blocks 46,47,48,49, and if no match is found, the signal is just passed through. If a match is found, one of the subroutines 50,51,52 and 53 is invoked to produce the corresponding output + or − indicated in FIG. 4.

Figure 3:
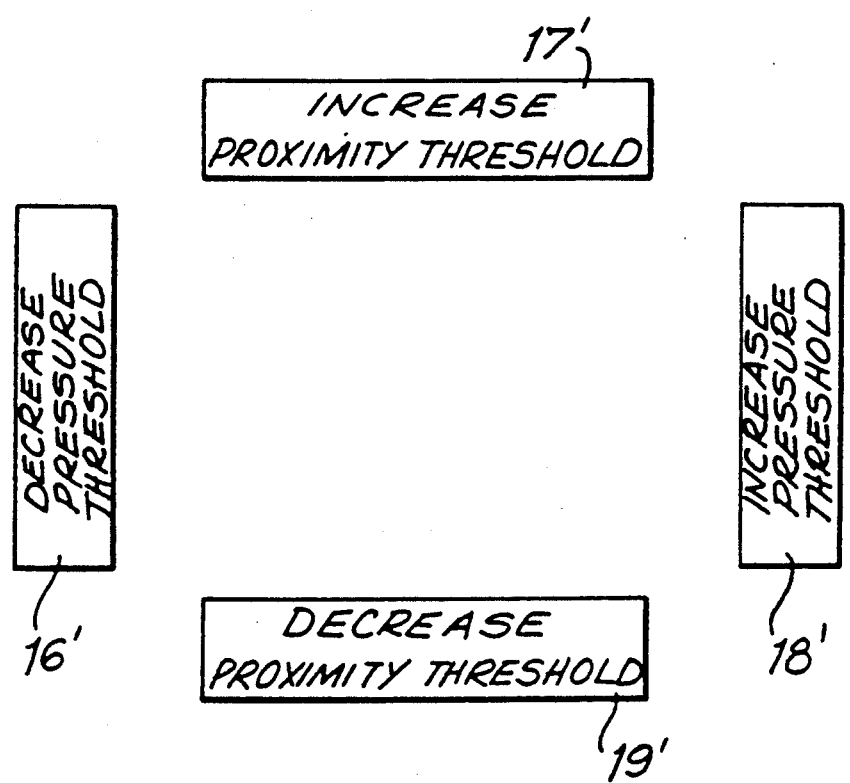
FIG. 3 shows labels that can be used in accordance with one form of tablet of the invention as illustrated in FIG. 1.

A feature of this invention is that each invocation of a subroutine 50..53 causes a fixed increase or decrease in the threshold value. In other words, the incrementation or decrementation is always the same value, whatever is necessary to produce a noticeable change to the user. In operation, when the user wants to adjust either threshold, he places his stylus on the picking area associated with the desired threshold change. The X and Y ranges indicated in the selection elements 46–49 in FIG. 2 correspond, respectively, to the picking areas of FIG. 1A. For the convenience of the user, labels 16'–19', may be placed on the tablet surface 11 overlying each of the picking areas (FIG. 1). One suitable label text is illustrated in FIG. 3, with label 16' indicating the place to position the stylus to decrease the o pressure threshold, label 18' to increase the latter, and labels 19' and 17' to lower and raise the corresponding proximity thresholds. Each tap of the stylus 20 by the user causes a fixed increase or decrease in the relevant threshold. A beeper 56 is activated each time a subroutine is invoked so the user knows the tablet is responding to his commands. The user will know by simple testing whether the proximity and threshold values are to his liking, and, if not, can continue to raise or lower the values until he is satisfied. Suitable software can be provided to save the last settings, or to default to mid-range settings when the tablet is reset.

To prevent the proximity threshold from falling below a minimum value when interactions between the stylus and tablet cease, it is preferred to test the proximity threshold value against a preset proximity value just above the absolute minimum. This is illustrated in FIG. 2 by decision block 60. When a stylus tap to reduce proximity is detected, it tests to determine if some factory set minimum is reached. If so, via flow 61, the decrementing block 51 is bypassed. If not, the proximity will be decreased in block 51. This same concept can be applied with respect to pressure and other parameters that could be altered in accordance with the invention.

For other tablet sizes or electrode geometries, obviously other picking area size could be chosen as would be appropriate within the principles described herein. The dimensions given are approximate and nominal and would depend on the area available, label appearance (aesthetics may figure into it), and tilt effects on the stylus. In a system that is sensitive to tilt (tilting the stylus causes changes in coordinates read, even though the point or tip does not move) then the label would be smaller to guide the user to the center of the usable area which would be as large as practical. In a non-sensitive to tilt system, there is more freedom with label sizes and even multiple areas could be available. For this particular embodiment, the proportions shown worked well. When using four long, large areas as described specifically, a label is not necessary, just the knowledge that the user should pick a point approximately ¼ inch outside the groove which can be used to define the active area of the tablet as described in my previous invention. This might be desirable if one preferred not to have a label on the surface, just a diagram in, say, a user's manual.

It will be observed that, essentially, no change is necessary in the tablet construction itself, other than to remove the shielding or reposition the shielding, and add a template on top designating the menu areas. The desired results are achieved area coordinate signals from the active, linear area coordinate signals, and invoke suitable routines to vary the processing circuitry parameter desired. While the use of the four wide-area menu areas are preferred, since fine coordinate position distinctions are unnecessary, the invention is not limited thereto and for example eight separate menu areas are easily provided to vary other circuit parameters by simply increasing the size of the look-up table, and providing routines and circuits to process the additional outputs. Moreover, the invention, while more easily implemented in software, is not limited thereto. Those skilled in the art will recognize that hard-wire circuitry can be provided to perform the same functions.

The invention thus provides a lower cost, simpler construction to implement some of the concepts disclosed in my prior patent, by using coordinate outputs from relatively large areas of the tablet which are normally unused because of accuracy and linearity constraints.

It is understood that the foregoing has shown and described particular embodiments of the invention, and that variations thereof will be obvious to one skilled in the art. Accordingly, the embodiments are to be taken as illustrative rather than limitative, and the true scope of the invention is as to set out in the appended claims.

What is claimed is:

1. A digitizer comprising:
   (a) a digitizer tablet having a generally planar top surface and electrodes extending substantially in a plane parallel to and below said surface, said electrodes defining along their edges a first substantially rectangular area aligned with the X and Y axes of a rectangular coordinate system,
   (b) a pointing device connected to the tablet and cooperating with the electrodes, when activated, to generate electrical signals representative of X and Y coordinate positions of the location of the pointing device with respect to said first substantially rectangular area,
   (c) processing means connected to said electrodes and pointing device for processing said electrical signals, said processing means including:
      i. means for distinguishing first digital signals representative of the pointing device location over at least one narrow marginal area adjacent a side of and within said first rectangular area from second digital signals representative of the pointing device location elsewhere over said first rectangular area, ii. means for processing said first digital signals to vary an electrical parameter of said processing means, said processing means for said first digital signals including: means for raising and lowering an out-of-proximity threshold level representative of the height of the pointing device from the electrodes above which electrical signals are not processed, and means for raising and lowering a pointing device pressure threshold level below which electrical signals are not processed, iii. means for processing said second digital signals to produce pointing device location X/Y coordinate values.

2. A digitizer comprising:
(a) a digitizer tablet having a generally planar top surface and a periodical array of electrodes extending substantially in a plane parallel to and below said surface, said electrodes defining along their edges a first substantially rectangular area aligned with or parallel to the X and Y axes of a rectangular coordinate system,
(b) a pointing device connected to the tablet and cooperating with the electrodes, when activated, to generate electrical signals representative of X and Y coordinate positions of the locations of the pointing device with respect to said first substantially rectangular area, said entire first rectangular area of electrodes being capable of cooperating with the pointing device to generate X and Y coordinate-indicating electrical signals,
(c) said periodical array of electrodes defining a second smaller rectangular area lying entirely within the first rectangular array within which the electrodes cooperate with said pointing device to generate X and Y coordinate-indicating electrical signals that are substantially linear with respect to pointing device movements over said rectangular area, leaving between the sides oft he first and second rectangular area four elongated marginal areas extending in the X and Y directions and within which the said electrodes cooperate with said pointing device to generate X and Y coordinate-indicating electrical signals that are non-linear with respect to pointing device movements over said marginal areas,
(d) processing means connected to said electrodes and pointing device for processing said electrical signals, said processing means including:
  i. means for distinguishing first digital signals representative of the pointing device location over said marginal areas from second digital signals representative of the pointing device location over said second rectangular area,
  ii. means for processing said first digital signals to vary an electrical parameter of said processing means, said first digital signal processing means including: means for raising and lowering an out-of-proximity threshold level representative of the height of the pointing device from the electrodes above which electrical signals are not processed, or means for raising and lowering a pointing device pressure threshold level below which electrical signals are not processed,
  iii. means for processing said second digital signals to produce pointing device location X/Y coordinate values.

3. A digitizer as claimed in claim 2, wherein the first digital signal processing means includes both the first means for raising and lowering an out-of-proximity threshold level representative of the height of the pointing device from the electrodes above which electrical signals are not processed, and the second means for raising and lowering a pointing device. pressure threshold level below which electrical signals are not processed.

4. A digitizer as claimed in claim 3, wherein the processing means includes third means for coupling electrical signals generated when said pointing device is located over the left side and right side marginal areas to one of said first and second means, and fourth means for coupling electrical signals generated when said pointing device is located over the top and bottom marginal areas to the other of said first and second means.

5. A digitizer as claimed in claim 4, wherein first and second visible labels are placed on the tablet surface overlying the left and right side marginal areas respectively, and third and fourth visible labels are placed on the tablet surface overlying the top and bottom marginal areas, respectively, one set of said first and second, and third and fourth labels containing indicia indicative of the out-of-proximity threshold level, the other set of said first and second, and third and fourth labels containing indicia indicative of the pressure threshold level.

6. A digitizer as claimed in claim 5, wherein one label of the set indicative of the out-of-proximity level has indicia indicating an increasing level and the other label of the set has indicia indicating a decreasing level, one label of the set indicative of the pressure level has indicia indicating an increasing level and the other label of the set has indicia indicating a decreasing level.

7. A digitizer as claimed in claim 6, wherein the first and second means includes means responsive to electrical signals generated when said pointing device is over the marginal areas to increment or decrement by a fixed amount the said levels.

8. A digitizer as claimed in claim 7, wherein signals generated when the pointing device is over one label of a set increments the level and signals generated when the pointing device is over the other label of the set decrements the level.

9. A digitizer comprising:
(a) a digitizer tablet having a generally planar top surface and electrodes extending substantially in a plane parallel to and below said surface, said electrodes defining along their edges a first substantially rectangular area aligned with the X and Y axes of a rectangular coordinate system,
(b) a pointing device connected to the tablet and cooperating with the electrodes, when activated, to generate electrical signals representative of X and Y coordinate positions of the location of the pointing device with respect to said first substantially rectangular area, the generation of said electrical signals or their values being dependent upon a condition of the pointing device or its relation to the tablet,
(c) processing means connected to said electrodes and pointing device for controlling the generation of and the processing of said electrical signals, the condition of the pointing device or its relation to the tablet being controlled by the value of an electrical parameter of said processing means, said processing means including:
  i. means for distinguishing first digital signals representative of the pointing device location over at least one narrow marginal area adjacent a side of and within said first rectangular area from second digital signals representative of the pointing device location elsewhere over said first rectangular area, ii. means for processing said first digital signals to vary said electrical parameter of said processing means and thereby determine the conditions under which the electrical signals or their values are generated, iii. means for processing said second digital signals to produce pointing device location X/Y coordinate values.

10. The digitizer of claim 9, wherein the pointing device condition is pointing device pressure, and the pointing device relation is its proximity to the tablet.

11. A digitizer comprising:
(a) a digitizer tablet having a generally planar top surface and a periodical array of electrodes extending substantially in a plane parallel to and below said surface, said electrodes defining along their edges a first substantially rectangular area aligned with or parallel to the X and Y axes of a rectangular coordinate system,
(b) a pointing device connected to the tablet and cooperating with the electrodes, when activated, to generate electrical signals representative of X and Y coordinate positions of the locations of the pointing device with respect to said first substantially rectangular area, said entire first rectangular area of electrodes being capable of cooperating with the pointing device to generate X and Y coordinate-indicating electrical signals,
(c) said periodical array of electrodes defining a second smaller rectangular area lying entirely within the first rectangular array within which the electrodes cooperate with said pointing device to generate X and Y coordinate-indicating electrical signals that are substantially linear with respect to pointing device movements over said second rectangular area, leaving between the sides of the first and second rectangular areas four elongated marginal areas extending in the X and Y directions and within which the said electrodes cooperate with said pointing device to generate X and Y coordinate-indicating electrical signals that are non-linear with respect to pointing device movements over said marginal areas,
(d) processing means connected to said electrodes and pointing device for processing said electrical signals, said processing means including:
i. means for distinguishing first digital signals representative of the pointing device location over at least one of said marginal areas from second digital signals representative of the pointing device location over said second rectangular area,
ii. means for processing said first digital signals to vary an electrical parameter of said processing means, the processing means of said elements (d) ii including means for incrementing or decrementing the value of said electrical parameter in response t each time that first digital signals are generated,
iii. means for processing said second digital signals to produce pointing device location X/Y coordinate values.

12. The digitizer as claimed in claim 11, wherein the first digital signal processing means includes: first means for distinguishing digital signals representative of pointing device location over different marginal areas, second means for incrementing the electrical parameter value when the digital signal is representative of the pointing device location over one marginal area, and third means for decrementing the electrical parameter value when the digital signal is representative of the pointing device location over another marginal area.

13. A digitizer comprising:
(a) a digitizer tablet having a generally planar top surface and a periodical array of electrodes extending substantially in a plane parallel to and below said surface, said electrodes defining along their outer edges a first rectangular area aligned with or parallel to the X and Y axes of a rectangular coordinate system,
(b) a pointing device connected to the tablet and cooperating with the electrode array, when activated, to generate electrical signals representative of X and Y coordinate positions of the location of the pointing device with respect to said first rectangular area, said entire first rectangular area of electrodes being capable of cooperating with the pointing device to generate X and Y coordinate-indicating electrical signals,
(c) said periodical array of electrodes defining a second smaller rectangular area lying entirely within the first rectangular array within which the electrodes cooperate with said pointing device to generate X and Y coordinate-indicating electrical signals that are substantially linear with respect to pointing device movements over said second rectangular area, leaving between the sides of the first and second rectangular area four elongated marginal areas extending in the X and Y directions and within which the said electrodes cooperate with said pointing device to generate X and Y coordinate-indicating electrical signals that are non-linear with respect to pointing device movements over said marginal areas, at least one picking area lying wholly within the associated marginal area,
(d) processing means connected to said electrodes and pointing device for processing said electrical signals, said processing means including:
i. means for distinguishing first digital signals representative of the pointing device location over said picking areas from second digital signals representative of the pointing device location over marginal areas outside of the picking areas and from third digital signals representative of the pointing device location over said second rectangular area,
ii. means for processing said first digital signals to vary an electrical parameter of said processing means,
iii. means for processing said third digital signals to produce and output pointing device location X/Y coordinate values.

14. The digitizer as claimed din claim 13, further comprising switch means in the output path of said X/Y coordinate values, and means connecting said switch means to the first digital signal processing means.

15. The digitizer as claimed in claim 13, wherein the value of the electrical parameter determines the pointing device proximity threshold to the tablet.

16. The digitizer as claimed in claim 15, further comprising means for limiting the value of the electrical parameter such that the lowest proximity threshold does not fall below a level which allows normal operation and does not prevent the pointing device from being detected.

17. The digitizer of claim 13, wherein each picking area is smaller than its associated marginal area.

* * * * *

UNITED STATES PATENT AND TRADEMARK OFFICE
CERTIFICATE OF CORRECTION

PATENT NO. : 4,992,630

DATED : February 12, 1991

INVENTOR(S) : Alfred E. Mletzko et al.

It is certified that error appears in the above-identified patent and that said Letters Patent is hereby corrected as shown below:

Title page, item [75]; add --Thomas C. Zalenski, Killingworth, Connecticut-- to list of inventors.

Column 6, line 24, change "proximitY" to --proximity--.

Column 9, line 25, change "locations" to --location--.

Column 11, line 58, change "t" to --to--.

Column 12, line 53, change "din" to --in--.

Signed and Sealed this

Twentieth Day of October, 1992

Attest:

DOUGLAS B. COMER

*Attesting Officer*  *Acting Commissioner of Patents and Trademarks*